Feb. 26, 1963  H. KITSON, JR., ETAL  3,079,519
COIL AND METHOD OF INSULATING SAME
Filed Feb. 29, 1956  3 Sheets-Sheet 1

Inventors:
Harold Kitson, Jr,
Walter L. Marshall,
Henry E. Mazanek,
by Vernon F. Kalb
Their Attorney.

Feb. 26, 1963 H. KITSON, JR., ETAL 3,079,519
COIL AND METHOD OF INSULATING SAME
Filed Feb. 29, 1956 3 Sheets-Sheet 2

Inventors:
Harold Kitson, Jr.,
Walter L. Marshall,
Henry E. Mazanek,
by Vernon F. Kalb
Their Attorney.

Inventors:
Harold Kitson, Jr.,
Walter L. Marshall,
Henry E. Mazanek,
by Vernon H. Kalb
Their Attorney.

United States Patent Office 3,079,519
Patented Feb. 26, 1963

3,079,519
COIL AND METHOD OF INSULATING SAME
Harold Kitson, Jr., Scotia, Walter L. Marshall, Schenectady, and Henry E. Mazanek, Amsterdam, N.Y., assignors to General Electric Company, a corporation of New York
Filed Feb. 29, 1956, Ser. No. 568,615
8 Claims. (Cl. 310—208)

The invention described herein relates to dynamoelectric machines and more particularly to an improved coil and method of insulating same. The principal object of this inveniton is to provide a motor having improved coils insulated in a manner to permit efficient operation of the machine while submerged in either a gaseous or liquid medium subjective to high pressure.

The foremost difficulty encountered in attempting operation of a dynamoelectric machine in contaminated atmospheres or while submerged in water, or other liquid medium, is that the insulation covering on the several coils of the machine winding fail after a relatively short period of use. Such failure is attributed to several causes, but principally to the fact that the insulation deteriorates when attacked by chemicals, for example, and when operated submerged, a dead short is created upon the infiltration of water through the insulation to the energized coils in the machine. Further, the coils are subjected to stresses caused by magnetic fields developed during operation which result in a weakening or rupturing of the insulation, ultimately causing grounding of the coils and subsequent failure of the machine. Evidence of this problem is manifested by the host of difficulties presented in merely insulating a motor for use in ocean going vessels for example, where the high humid air causes creepage paths of low resistance in the insulation thereby permitting flow of current from current carrying coils to other motor elements of lower potential. Another important factor causing coil failure is the absorption of moisture by the insulation which accelerates its deterioration at an undue and rapid rate.

Certain industrial uses however require submerged operation of machines and designers accordingly have made them watertight by totally enclosing the electrodynamically operating parts in an impervious shell. This structure is generally effective in withstanding creepage of moisture into the shell at low pressures, but only at the expense of loss in efficiency because of the lack of means for carrying away heat generated during machine operation. It has been found that totally enclosed machines are not effective when subjected to high pressures in the neighborhood of 2000–3000 p.s.i. because of failure occurring in seals between the armature shaft and housing for the machine. The prime advantage therefore derived from the use of a "wet" machine, i.e., one where liquid is in contact with the coils, is that it can be made smaller and there is complete elimination of structure necessary in obtaining watertight integrity, as for example, seals placed between the shaft and housing for the machine.

Still another type of machine currently employed for submerged use is a "canned" motor wherein the stator is enclosed within a container or can for preventing access of water to the coils. This latter machine is subject to the disadvantage of low efficiency caused by high eddy current losses that take place in that portion of the can positioned in the air gap. As a result, the "canned" machine must be made of a larger size than a "wet" machine, it is not as efficient and is more expensive to manufacture.

In view of the foregoing, it is evident that the need is acute for a machine capable of efficient and safe operation equally in a gaseous or liquid medium without being burdened with expensive seals and housings heretofore necessary in totally enclosed equipment.

In carrying out our invention, we eliminate the above-noted deficiencies of prior art machines by providing coils with an insulation of electron irradiated polyethylene thereby permitting a liquid, in which the machine is submerged for operation, to flow freely around and in contact with the coils without creating any adverse electrical characteristics in the electrodynamically operating parts. Thus, the current flowing through each coil in obtaining machine operation is confined to a singular path, without leakage, thereby resulting in efficient use, whether in a gaseous medium, such as contaminated atmospheres or in a liquid medium.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawings in which:

Figure 1:
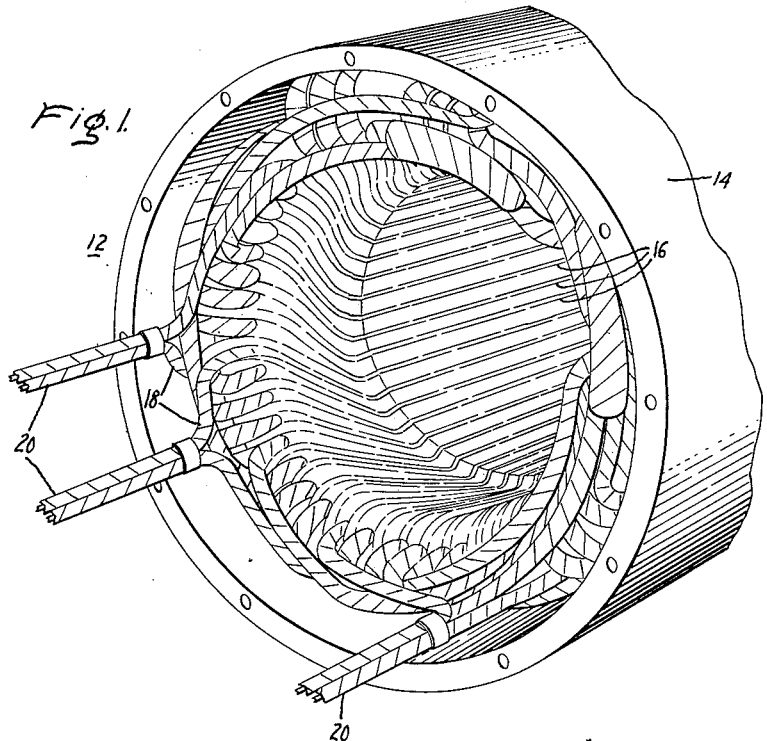
FIGURE 1 is a perspective view of a stator for a machine showing the arrangement of windings therein.

Referring now to the drawings wherein like reference characters designate like or corresponding parts throughout the several views, there is shown in FIGURE 1, a stator 12 for a dynamoelectric machine arranged to receive a rotor (not shown) in the usual manner. The stator 12 is enclosed within a housing 14 and comprises a plurality of laminations provided with slots 16 for receiving coils 18 which form the winding for the machine. Leads 20 extend outwardly therefrom for connection to an appropriate power source used in obtaining machine operation.

Figure 2:
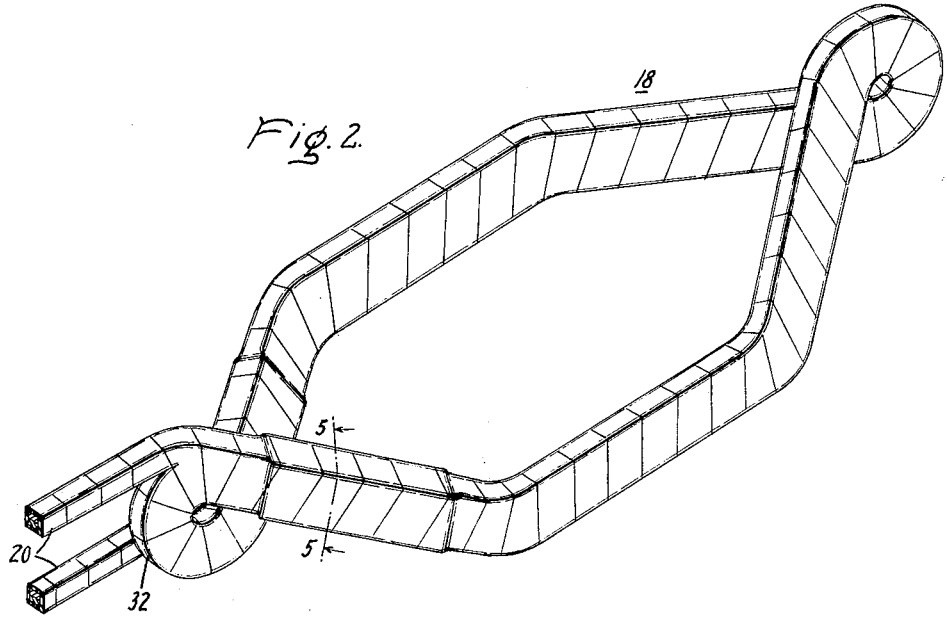
FIGURE 2 is a perspective view of a finished coil provided with a cover of impervious insulation.

In order to have the machine of this invention operate while submerged in water, the coils 18 are insulated with a material having negligible water absorption and excellent electrical characteristics and capable of permitting water contact therewith at high pressures. One of the completely insulated coils is illustrated in FIGURE 2 and comprises a pair of spaced rectangular copper conductors 22 shaped in the form shown in FIGURES 2–4, insulated from one another by their strips of insulating material and bent in a manner well known in the art to fit within the slot 16 provided in the stator.

The coil shown is covered with electron irradiated polyethylene, a film material produced by treating commercially available polyethylene in the manner disclosed and claimed by Elliott J. Lawton and Arthur M. Bueche in copending application Serial No. 324,552 filed December 6, 1952, and assigned to the same assignee as the present invention. The product resulting from the treatment set forth in the above-mentioned Lawton and Bueche application has a high tensile and tear strength, excellent resistance to acids, alkalies and water-borne chemicals, negligible water absorption and excellent electrical characteristics. It has been found however that this insulating product, hereinafter called irradiated polyethylene, when applied to a coil, may be readily cut by the sharp edges of a stator slot if care is not exercised during installation of the coils. In order to preclude this possibility, an overtaping of various fibrous tapes made from materials such as polyethylene terephthalate (Dacron), polyacrylonitrile (Orlon), glass, etc., may selectively be applied over the irradiated polyethylene film to provide an armor having sufficient cu-through properties to permit general factory handling. Further, under some conditions, the irradiated polyethylene film or coating may oxidize but this may be prevented either by incorporating an oxidation inhibitor in the film prior to irradiation or by applying thin overcoatings of varnish, such as a medium length oil-modified asphaltic or phenolic resin varnish. The latter is the preferred method since the varnishes additionally provide protection against the attack of oil and also serve to anchor the armor while simultaneously preventing an oxide coating from forming on the insulation. This means of protecting the coil is more particularly disclosed and claimed in Mathes et al. Patent 2,929,744 assigned to the same assignee as the present invention.

The following steps are performed in carrying out the process utilized in wrapping the coil herein disclosed:

(1) The rectangular sections of copper conductors 22 are shaped in the desired form to fit within stator slots 16 with leads 20 extending outwardly in the manner shown in these figures.

(2) Three half lap layers of oriented irradiated polyethylene are wrapped on the coil leads.

Figure 3:
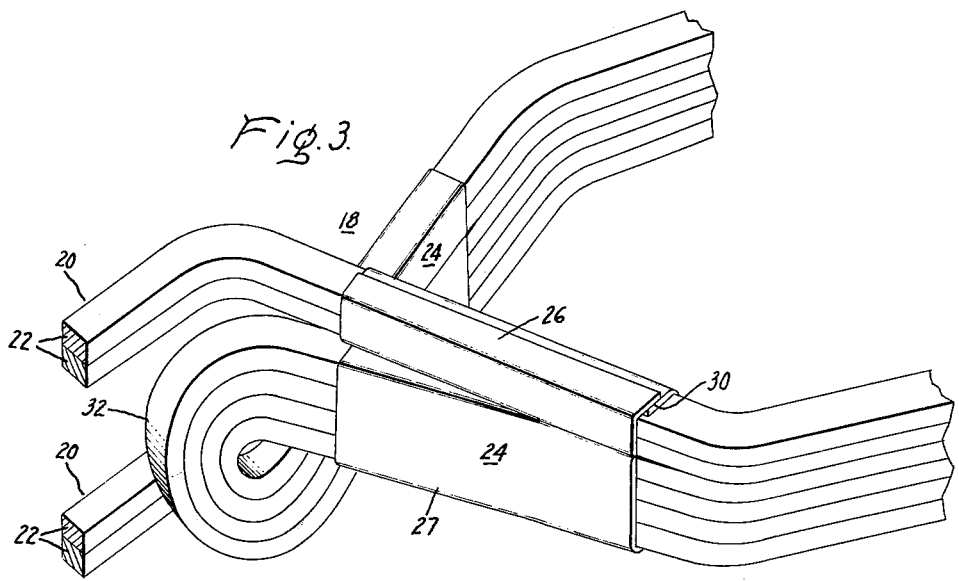
FIGURE 3 shows a step in the process of wrapping the coil with electron irradiated polyethylene.
Figure 4:
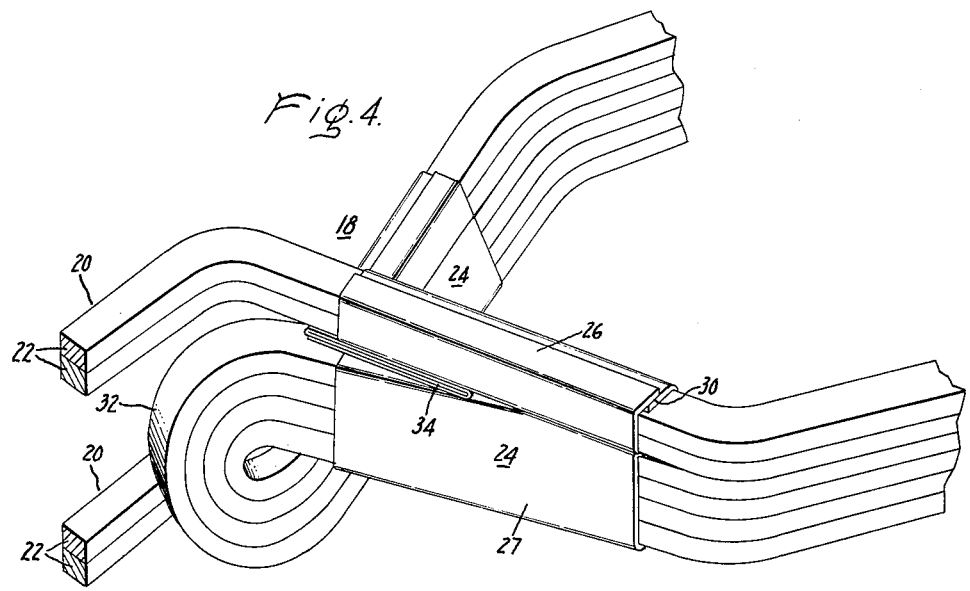
FIGURE 4 is a perspective view of a portion of a coil illustrating the means for obtaining a water-tight joint between a lead extending outwardly from the coil and the coil body.
Figure 6:
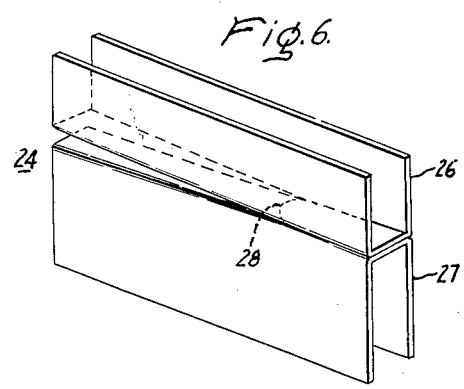
FIGURE 6 illustrates the design of insulation adapted for insertion between the lead and coil shown in FIGURE 4.

(3) In order to obtain a firm seal at a point where the leads 20 leave the coil body, H pieces 24, illustrated in FIGURE 6, are inserted between the leads and coil in the manner shown in FIGURE 4. The H piece 24 consists of a pair of irradiated polyethylene strips 26 placed back to back and fused at 28 so as to provide a member with a figure H cross section when the sides are bent in the shape of a U. As illustrated in FIGURES 3 and 4 the sides 26 are overlapped at 30 so as to completely enclose this portion of the coil.

(4) Two half lap layers are applied to the coil nose 32 between the leads 20 overlapping as much as possible the H piece 24 inserted by the previous step.

(5) Two half lap layers are then wrapped around the entire coil including leads 20, or if desired, a sheet of irradiated polyethylene may be used as a wrapper in the slot portion of the coils.

(6) An overtaping of Dacron tape is wound on the irradiated polyethylene coating to provide an armor for the purposes set forth in the preceding portion of this specification.

(7) The coil is then heated in an oven at a temperature between 125° and 175° C. for approximately one hour or until the copper temperature reaches at least 115° C. to yield sealing and lamination of the layers in addition to shrinking of the film.

In the alternative, a sacrifice taping of varnished cambric and cotton may be applied to the coil prior to placing it in a vacuum compounding tank where the coil is processed by evacuating the tank at a temperature below 80° C. followed by a gradual increase in temperature to above 115° C. with the vacuum maintained. Asphaltic compound, or any other heat stable fluid, is admitted to the tank at 150° C. and nitrogen is then introduced at a pressure of approximately 100 p.s.i. This process serves to evacuate the air from the insulation and then heat seal it under pressure to give a substantially void free structure. In this latter step of the process, sufficient care must be exercised to prevent the compounding fluid from flowing into the irradiated polyethylene coating. This is accomplished by the use of the multiple layers of varnished-cambric and cotton sacrifice tapes. Dips or spray coatings of cellulose acetate, carboxy methyl cellulose or vinyl chloride, for example, all on top of a fabric taping or heat sealable films such as unsupported polyvinyl chloride may also be used in preventing the infiltration of the compounding fluid into the irradiated polyethylene. In all of these examples, the protective layers are removed following the vacuum pressure cycle.

(8) This heat sealed structure with the Dacron armor taping is then treated with several varnish dip and cure cycles to permit a thin but stable build up of an adequate protective film. An additional benefit gained by the application of this varnish coating is improved sealing of the armor to the irradiated polyethylene giving more dimensionally accurate insulation and better cut-through protection.

It is especially important that a good seal be obtainable at the coil-lead juncture. An alternative method of achieving such a seal, is to additionally insert at the juncture, a peroxide cured material 34 such as silicone rubber putty or non-irradiated polyethylene. The positioning of this material at the juncture is shown in FIGURE 4. In particular, where heating alone is used to shrink and seal the irradiated polyethylene, a small amount of silicone putty placed between the lead and coil and against the irradiated polyethylene will fuse to the latter during the heat cycle and cure to a firm rubber.

These coils are then inserted into the motor stator in the usual manner with care being taken to avoid cutting the insulation. End connections to the leads are made by overtaping the clean irradiated polyethylene surface of the leads with multiple layers of oriented irradiated polyethylene to provide an overlapping cover over the joint and over the adjacent coil and lead insulation. Care must be taken to cover any exposed copper surfaces with an intervening separatory layer such as oriented polyethylene terephthalate or glass tape to prevent danger of copper catalysed oxidation of the irradiated polyethylene. The overtaped joints may be heat sealed by a heat treatment (125–150° C.) during which an additional overlayer of "post oriented" polyethylene terephthalate is used which serves as shrink mold around the irradiated polyethylene yielding a very compact final insulation on the joint. The sacrificing taping of polyethylene terephthalate is then discarded prior to varnish treatment of the end connections. The use of polyethylene terephthalate for this purpose is more specially set forth in the application of Walter L. Marshall, Patent 2,993,820 assigned to the same assignee as the present invention.

Figure 5:
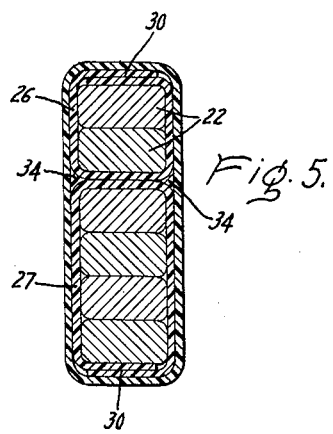
FIGURE 5 is a view taken on lines 5—5 in FIGURE 2.

As indicated in step 7, the H piece is effective in obtaining a seal when the vacuum-pressure process is used. This step in the process may be augmented by a dicumyl peroxide filled polyethylene sheet placed adjacent the H piece which yields, following processing, a well sealed juncture. The action in this instance is that the heat and pressure causes the peroxide added polyethylene to melt and flow around sufficiently to fill the openings, then subsequently cures in place to form an excellent bond with the irradiated polyethylene. As shown in FIGURE 5, when the processing is complete, the coil is wholly encapsulated in the irradiated polyethylene, i.e. crosslinked infusible polyethylene, thereby precluding the entry of water or other contaminant into the insulated coil. Electrical measurements on the vacuum processed coils described above, yielded a corona start voltage of 65 volts/mil crest and a plateau intensity of 25 micromicrocoulombs at 120 volts/mil as compared to a standard varnished cambric coil having a corona start voltage of 45 volts/mil and a plateau intensity of 1600 micromicrocoulombs at 120 volts/mil. Also on a voltage stress endurance test after 300 hours at 75° C. the R.M.S. volts/mil rating for a 60 mil insulation of irradiated polyethylene was 225 vs. an R.M.S. rating for another known system of 150 volts/mil at 300 hours. The coils further, have been immersed in water at 3000 p.s.i. and 70° C. for 100 hours with resistance dropping to no lower than 2,400 megohms.

Figure 7:
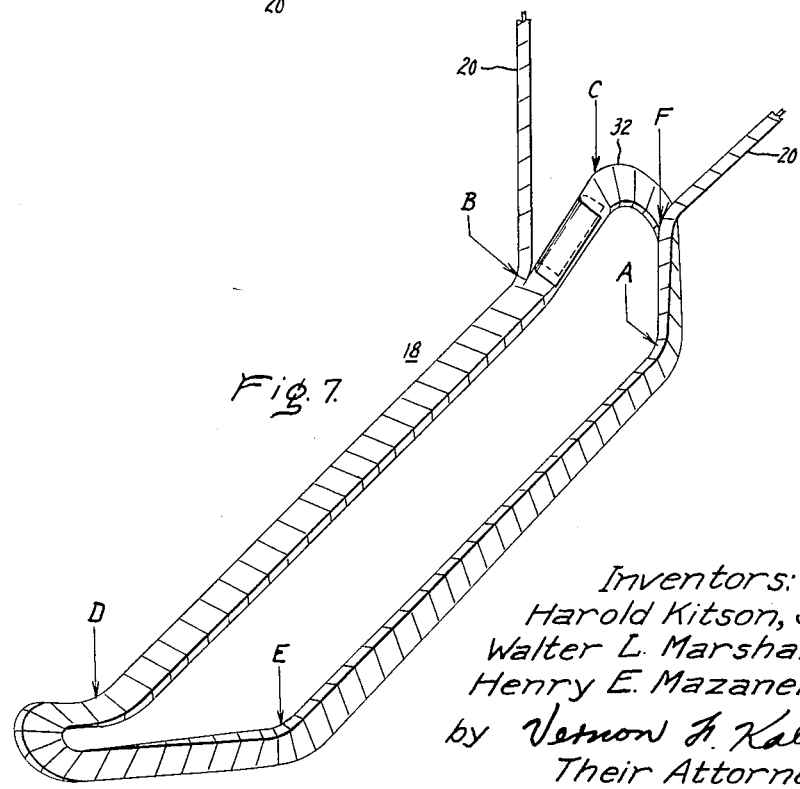
FIGURE 7 illustrates a modification of the insulated coil shown in FIGURE 2.

FIGURE 7 illustrates a coil having a modified insulating system which comprises the steps of:

(1) Taping one-half lap of irradiated polyethylene around the lead end of the coil from point A to B; overlapping one-half lap dicumyl peroxide catalyzed polyethylene tape on the irradiated polyethylene and then taping one-half lap irradiated polyethylene on the catalyzed polyethylene.

(2) Taping three one-half laps irradiated polyethylene on the leads 20.

(3) Inserting three thicknesses of dicumyl peroxide catalyzed polyethylene between the lead and coil body to extend down over the sides of the coil. It is important that the catalyzed polyethylene should be inserted as far under the lead 20 at point B as possible and extend out to the point where the lead leaves the coil as at point C.

(4) The leads 20 are then bent downwardly against the coil and one-half lap irradiated polyethylene taped completely around the coil starting at point C and continuing past C with the second half lap to D.

(5) The opposite end of the coil is taped from points D to E with one-half lap dicumyl peroxide catalyzed polyethylene.

(6) Completing the second half lap of irradiated polyethylene around the coil ending at point F; and (7) Applying sacrifice tapes consisting of dacron, vinyl chloride and cotton prior to compounding by the use of the vacuum-pressure method described above, stripping, and the coil is then ready for use with no further treatment being necessary.

It will be noted that the H piece of the previous modification has been eliminated in this embodiment and that a layer of dicumyl peroxide catalyzed polyethylene has been inserted between the layers of irradiated polyethylene to add to the bond strength of the system. The elimination of the H piece simplifies the taping operation and eliminates the necessity of providing a separate prefabricated piece of material.

The principal advantage derived from the use of dicumyl peroxide catalyzed polyethylene is that it will melt and flow at a temperature less than that required for irradiated polyethylene. In doing so, it fills all the void spaces appearing under the layer of irradiated polyethylene, and upon curing, forms a firm bond therewith and the resultant product exhibits properties peculiarly adapting it for coil insulation. In view of this teaching, it will be evident that various processes may be practiced in wrapping a coil of the type herein disclosed. For example, in addition to the preferred method of wrapping outlined above, the following processes may just as effectively be carried out:

(1) Wrap the complete coil with a coating of irradiated polyethylene.

(2) Cover this coating with a layer of dicumyl peroxide catalyzed polyethylene taking care to provide a slight build-up at the lead-coil juncture so as to assure flow of the catalyzed polyethylene into the area where the leads exit from the coil.

(3) Tape an outer layer of irradiated polyethylene on the catalyzed polyethylene; and (4) Subjecting the covered coil to the above described vacuum-pressure-heat treatment to remove air from between the various layers of material applied to the coil and to obtain a fusion of the materials to provide an electrically insulated, fluid impervious coil.

A slightly different process consists of applying alternate layers, totalling four, of dicumyl peroxide catalyzed polyethylene and irradiated polyethylene to a coil, followed by the above-described vacuum-pressure-heat treatment.

A still further embodiment consists of the application of a laminated layer of dicumyl peroxide irradiated polyethylene applied to a strip of irradiated polyethylene. The use of the latter type of material when applied to a coil following either of the two processes described above, provides a system which is equally as effective as that heretofore disclosed.

Obviously many modifications and variations of the present invention are possible in light of the above teachings. It is therefore to be understood that within the scope of the appended claims the invention may be practiced otherwise than as specifically described.

What we claim as new and desire to secure by Letters Patent of the United States is:

1. A dynamoelectric machine equally adapted for use in a liquid or gaseous medium comprising a stator and rotor arranged to react electrodynamically with one another, a winding in said stator comprising a plurality of coils each provided with an insulation of form stable irradiated polyethylene insensitive to water, a sealant firmly bonded to the insulation located between the coil body and leads extending outwardly therefrom, and an armour over said insulation, thereby permitting continuous operation of said machine when submerged in a liquid medium or operated in a contaminated atmosphere.

2. A dynamoelectric machine equally adapted for use in a liquid or gaseous medium comprising a stator and rotor arranged for electrodynamic reaction with one another, a winding in said stator comprising a plurality of coils insulated with form stable irradiated polyethylene and dicumyl peroxide catalyzed polyethylene, a sealant at the lead-coil juncture for preventing infiltration of liquid into the coil insulation, and a protective overlayer of Dacron tape, the insulation forming an impervious covering on said coils thereby permitting operation of said machine in a liquid.

3. A dynamoelectric machine equally adapted for use in a gaseous or liquid medium comprising a stator and rotor arranged for electrodynamic reaction with one another, a winding in said stator comprising a plurality of coils having liquid impervious coatings thereon of form stable irradiated polyethylene and dicumyl peroxide catalyzed polyethylene, said coatings being arranged in a manner to obtain a homogeneous covering on said coils thereby adapting said machine for submerged operation in a liquid, and an overcoating of armour on said coatings.

4. The process for insulating a coil having leads extending outwardly therefrom comprising the steps of wrapping form stable irradiated polyethylene on said coil, inserting a member of H shape configuration made of irradiated polyethylene augmented by a dicumyl peroxide filled polyethylene sheet at the juncture of the coil and leads, applying a sacrifice taping over the coil and subjecting it to a vacuum pressure process wherein the vacuum is maintained constant while the temperature is increased to greater than 115° C. and thereafter introducing a thick heat stable fluid at a temperature of 150° and under a nitrogen pressure of 100 p.s.i., and finally removing the sacrifice taping from said coil.

5. The process of insulating a coil having leads extending outwardly therefrom comprising the steps of taping form stable irradiated polyethylene on the nose end of said coil followed by consecutive overlayers of dicumyl peroxide catalyzed polyethylene and irradiated polyethylene, wrapping irradiated polyethylene on the leads for said coil, inserting dicumyl peroxide catalyzed polyethylene between the leads and coil body at a point where they extend outwardly therefrom, taping the coil end opposite from the leads with dicumyl peroxide catalyzed polyethylene, bending the leads against the coil and taping the entire coil with irradiated polyethylene, and thereafter subjecting said coil to a vacuum for withdrawing air resident between layers of the coatings and applying heat to said coil for obtaining a firm bond between said coil and the coatings imposed thereon.

6. The combination according to claim 1 wherein the sealant comprises an H-shaped piece of material having the same characteristics as the irradiated polyethylene.

7. The combination according to claim 1 wherein the sealant comprises a body of dicumyl peroxide catalyzed polyethylene which firmly bonds the irradiated polyethylene on the leads and coil into a mass of insulation impervious to water.

8. The combination according to claim 2 wherein the sealant comprises dicumyl peroxide catalyzed polyethylene.

References Cited in the file of this patent

UNITED STATES PATENTS

| | | |
|---|---|---|
| 1,848,344 | Goff | Mar. 8, 1932 |
| 2,169,097 | Hall et al. | Aug. 8, 1939 |
| 2,469,099 | Andrus | May 8, 1949 |
| 2,550,453 | Coggeshall | Apr. 24, 1951 |
| 2,606,134 | Sanders | Aug. 5, 1952 |
| 2,656,290 | Berberich et al. | Oct. 20, 1953 |
| 2,836,744 | Clawson | May 27, 1958 |

FOREIGN PATENTS

| | | |
|---|---|---|
| 511,718 | Belgium | Nov. 28, 1952 |

OTHER REFERENCES

"Irradiated Polyethylene," Modern Plastics, vol. 31, No. 8, April 1954, pages 100, 101, 219.

Modern Plastics, vol. 32, No. 1, September 1954, pages 141–144, 146, 148, 150, 229–233 and 236–238.